March 11, 1969 H. P. KALMUS 3,432,855
MOVING TARGET INDICATOR
Filed Feb. 5, 1968 Sheet 1 of 2
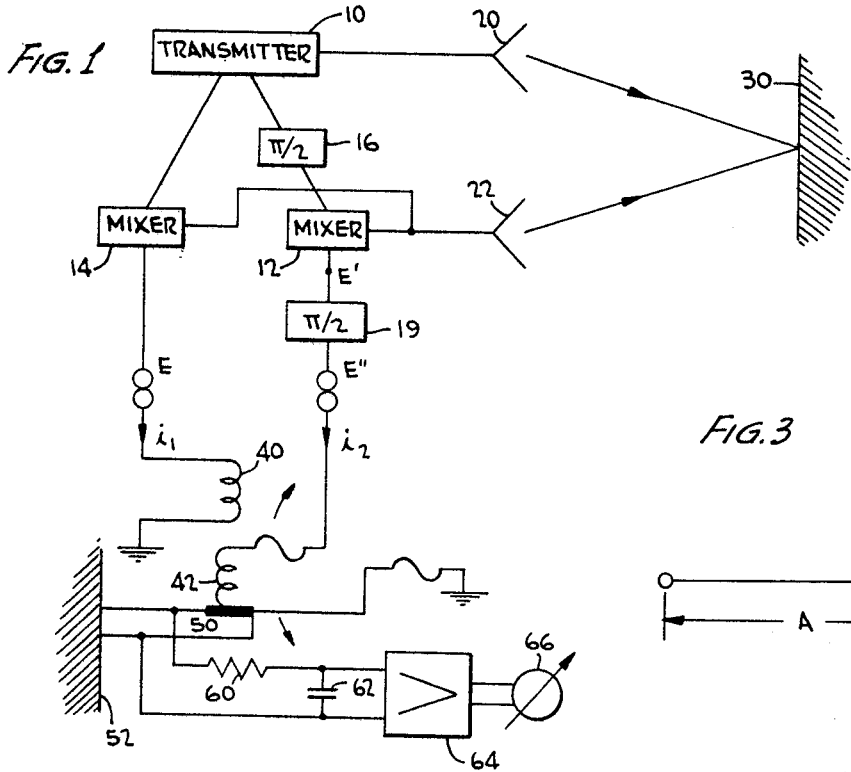
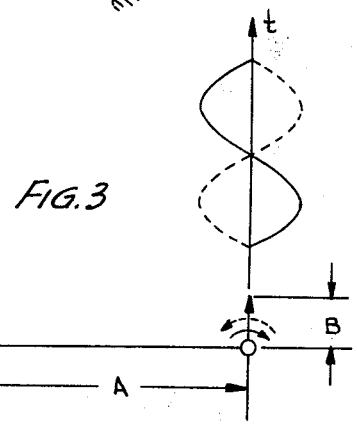
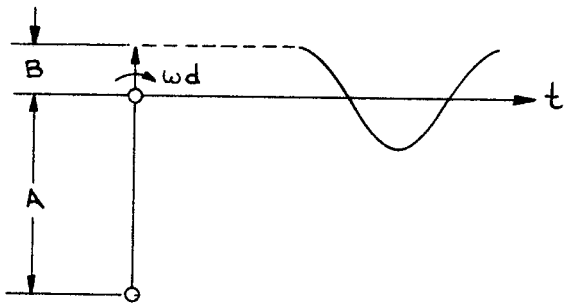
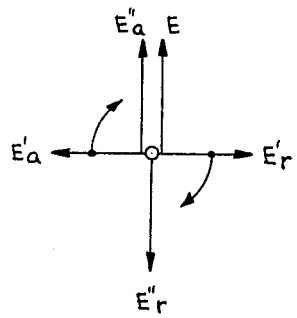
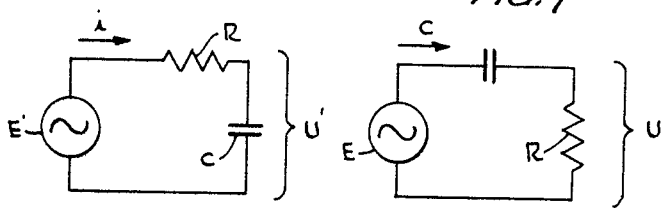
INVENTOR,
HENRY P. KALMUS
BY Harry M. Saragovitz
Edward J. Kelly, Herbert Berl
& Gerald L. Jett
ATTORNEYS

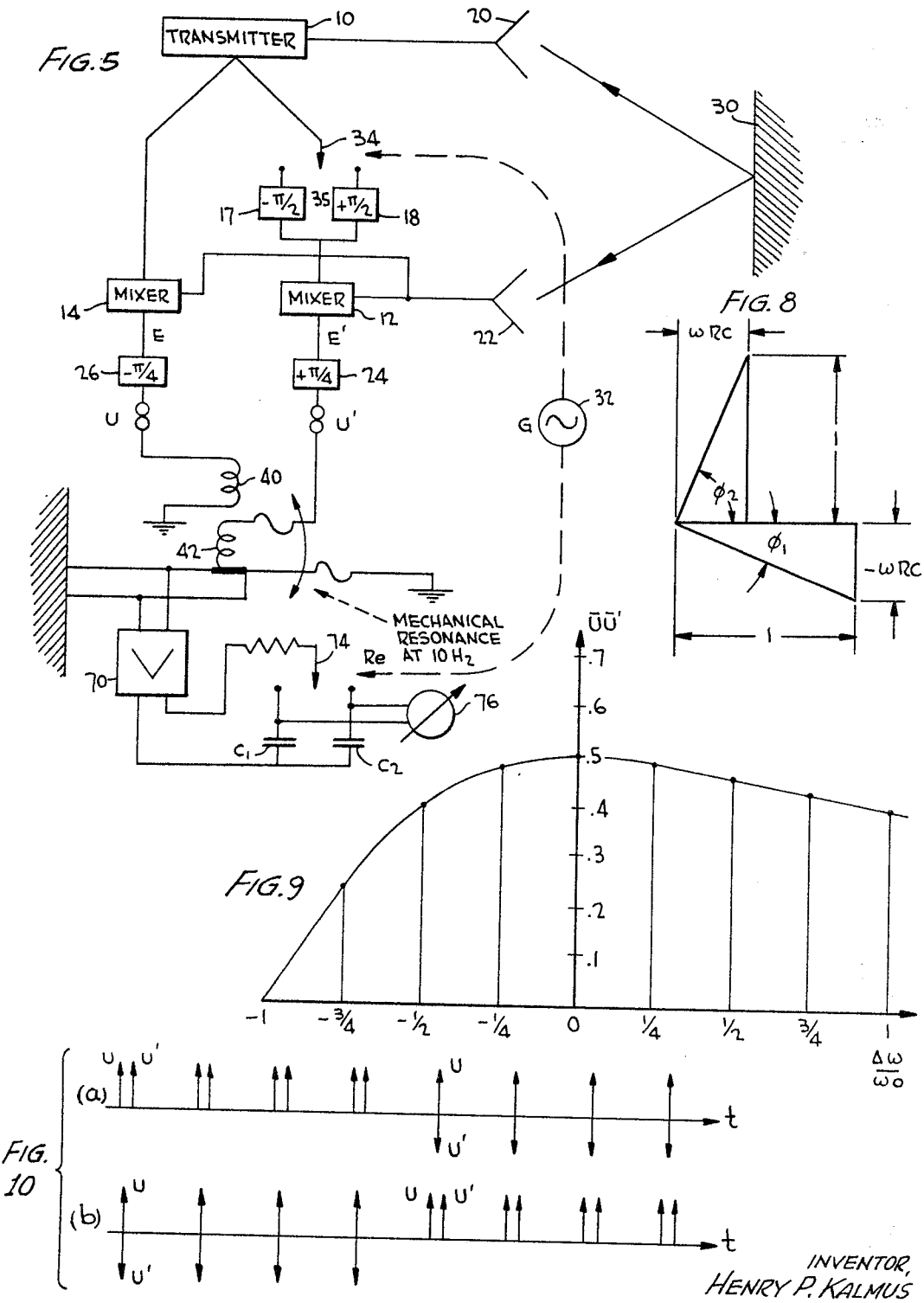

United States Patent Office 3,432,855
Patented Mar. 11, 1969

3,432,855
MOVING TARGET INDICATOR
Henry P. Kalmus, Washington, D.C., assignor to the United States of America as represented by the Secretary of the Army
Filed Feb. 5, 1968, Ser. No. 702,994
U.S. Cl. 343—7.7                    13 Claims
Int. Cl. G01s 9/42

ABSTRACT OF THE DISCLOSURE

A moving target indicator for detecting movement of targets deeply imbedded in clutter noise. The system uses the Doppler phenomenon to generate a signal that is a function of the relative velocity between the transmitter and the target. Another signal is simultaneously generated that is also a function of the relative velocity but has its phase shifted a fixed amount. The two signals are fed to a correlator which will produce a voltage that is proportional to the velocity of the target and whose polarity is dependent on the direction of the velocity of the target with respect to the target indicator system.

---

The invention described herein may be manufactured, used and licensed by or for the Government for governmental purposes without the payment to me of any royalty thereon.

Background of the invention

The detection of moving targets is usually based on the recognition of a Doppler wave. In its simplest form the device used for this purpose consists of a CW transmitter and a receiver in which the reflected wave is superimposed on part of the emitted wave. After rectification, energy at the difference frequency, i.e., the Doppler frequency, is obtained. Such devices have a poor signal-to-noise ratio because any amplitude modulation occurring in the transmitter or generated by fluctuating target return will cause signals that can simulate a Doppler wave and possibly overload the difference frequency amplifier. Improvement is obtained by providing range sensitivity in the receivers by the use of pulse techniques or frequency modulation. The clutter contributed by nearby targets is thus attenuated. The clutter produced by far away targets, however, may still produce severe interference and hamper recognition of the moving target.

There exists a pronounced difference between Doppler waves and clutter waves. The Doppler energy from a single continuously moving target appears as a continuous wave at either lower or higher frequencies compared with the frequency of the transmitted energy. The energy produced by clutter, however, will be distributed on both sides of the transmitter frequency, especially if observed over a certain period of time.

It is therefore an object of my invention to provide a moving target indicator that will reject clutter interference.

An additional object of my invention is to provide a moving target indicator utilizing a Doppler detection system which will not be affected by clutter interference.

An additional object of my invention is to provide a moving target indicator which will distinguish between approaching and receding targets and be unaffected by clutter interference.

Summary of the invention

A Doppler radar system which makes possible the detection of moving targets deeply embedded in clutter noise. The system is based on the use of quadrature detection and a new low level correlator. The correlator consists of two coils, one fixed and the other attached to a piezoelectric strip. When the coils bend the strip in one direction it produces a positive voltage and when bent in the other a negative voltage. In order to reject clutter interference most of the required amplification takes place after correlation and integration so that amplifier overloading is avoided.

Brief description of the drawings

FIGURE 1 is a schematic circuit representation of an embodiment of a moving target indicator in accordance with my invention.

FIGURE 2 is a phasor diagram used to explain the operation of my invention.

FIGURE 3 is a phasor diagram wherein the local signal is delayed in the circuit of FIGURE 1.

FIGURE 4 is another phasor diagram used to explain the operation of the circuit in FIGURE 1.

FIGURE 5 is a schematic circuit diagram of another embodiment of a moving target indicator in accordance with my invention.

FIGURE 6 is an equivalent circuit diagram for a signal produced within the moving target indicator of FIGURE 5.

FIGURE 7 is another equivalent circuit diagram for a signal prouduced during the operation of the moving target indicator of FIGURE 5.

FIGURE 8 is a graph illustrating a trigonometric relationship and is used to explain the operation of the circuit in FIGURE 5.

FIGURE 9 is a plot of voltage versus frequency used to explain the operation of the circuit of FIGURE 5.

FIGURE 10 illustrates the phase conditions of the Doppler waves during the operation of the circuit of FIGURE 5.

Description of the preferred embodiment

FIGURE 1 is a schematic circuit representation of an embodiment of my invention utilizing quadrature detection to distinguish between approaching and receding targets. The quadrature detection method is described in detail in my paper "Direction Sensitive Doppler Device," Proc. IRE, June 1965, pp. 698–700 and U.S. Patents Nos. 2,934,756 and 3,024,456. The circuit of FIGURE 1 has a transmitter 10 which emits a signal from antenna 20. The signal is reflected off a target 30 and received by antenna 22 which feeds the returned signal into mixers 12 and 14. Between the transmitter 10 and mixer 12 there is a delay network 16 to delay the signal from the transmitter to the mixer by $\pi/2$. A second delay circuit 19 is connected between the output of mixer 12 and the coil 42. The output of mixer 14 is connected to coil 40.

Coils 40 and 42 along with a bimorph piezoelectric strip 50 comprise an electromechanical correlator 52. Coil 40 is fixed in position and coil 42 is attached to the strip 50. If the strip is bent in one direction by the forces produced between the coils it produces a positive voltage, and if bent in the other direction a negative voltage. The signal produced by the electromechanical correlator is integrated by resistor 60 and capacitor 62 and fed through a D-C amplifier to phasemeter 66. During operation, a signal $A \cos \omega_1 t$ is emitted from transmitter 10 and the wave $B \cos(\omega_2 + \varphi)$ is reflected. If $\varphi = 0$ the conditions are shown in the phasor-diagram of FIGURE 2. For a receding target $\omega_2$ is smaller than $\omega_1$. If an increasing phase angle is denoted by counterclockwise rotation, B will rotate clockwise with an angular velocity $\omega_d = \omega_1 - \omega_2$. After the signals are mixed in square-law device 14 we obtain $$(A \cos \omega_1 t + B \cos \omega_2 t)^2 = A^2 \cos^2 \omega_1 t \\ + B^2 \cos^2 \omega_2 t + 2AB \cos \omega_1 t \cos \omega_2 t$$

The last term, the only one of present importance, is equal to $$AB \cos (\omega_1-\omega_2)t + AB \cos (\omega_1+\omega_2)t$$

The first term $E = AB \cos \omega_d t$ contains the difference frequency and represents the mixer 14 output. Because it is a cosine term, the projection of B on A along the time-axis supplies the shape of the Doppler wave. It can easily be seen that the same Doppler wave is obtained whether B rotates clockwise or counterclockwise. In other words, the mixer output is the same for receding or approaching targets and targets with reciprocating motion will be essentially indistinguishable from targets with unidirectional motion.

The second mixer 12 has the local signal delayed by $\pi/2$ in delay network 16 and the return wave from antenna 22 fed to it as before. The B phasor is again vertical, but the A phasor appears in the horizontal position as shown in FIGURE 3. Compared with FIGURE 2, there is an important difference: For receding targets the wave is delayed by $\pi/2$ and for approaching targets it is advanced by $\pi/2$. Mathematically:

For receding targets: $\omega_{dr} = (\omega_1-\omega_2) = \omega_d$. Denoting the mixer 12 output E', $E'_r = AB \cos (\omega_d t - \pi/2)$.

For approaching targets: $\omega_{da} = -\omega_d$.

$$E'_a = AB \cos (-\omega_d t - \pi/2) = AB \cos (\omega_d t + \pi/2)$$

The correlator 52 is fed by currents $i_1$ and $i_2$ derived from waves E and E'', where E'' is derived from E' through a second delay network.

$$E'' = E' e^{-j\pi/2}$$
$$E''_r = AB \cos (\omega_d t - \pi)$$
$$E''_a = AB \cos \omega_d t$$

The above conditions being shown in the phasor diagram of FIGURE 4.

Comparing the E wave with the E'' wave, we notice that for approaching targets the waves are in phase. For receding targets, they are in opposition. Hence, the correlator 52 has to supply a positive voltage for in-phase inputs and a negative voltage for out-of-phase inputs.

Clutter can be suppressed by introducing an appropriate integration network following the correlator, such as the RC network shown in FIGURE 1 consisting of resistor 60 and capacitor 62. Operation of correlator 52 is linear in the ranges desired and it is a "real" multiplier; one wave alone will not produce any output. Additionally it works at a very low input level. Preferably the coils 40 and 42 of the correlator should be driven from constant current generators such as pentodes or solid-state devices with small gain, so that overloading is avoided.

In FIGURE 1, the use of two phase shifters, one for the local high-frequency wave and the other for the mixer output, may not be understood. It may seem that a single phase shifter with twice the delay should serve the same purpose; this objection is based on the fact that in a superheterodyne receiver it is irrelevant whether a phase shift is introduced before or after the mixer since the result is the same. This is correct as long as the difference frequency $\omega_d$ does not change its sign. In our case, however, $\omega_d$ can be positive or negative. Hence, as shown before, the first phase shifter 16 produces a delay of the mixer output for receding and an advance for approaching targets. The second phase shifter 19 produces a delay, independent of target motion.

The embodiment of FIGURE 1 has two drawbacks. First, the second phase shifter 19 has to produce the $\pi/2$ delay over a wide range of frequencies and second, the correlator output is a small D-C voltage, and D-C amplification with high sensitivity presents difficulties. In addition, the correlator will also produce an interfering offset voltage.

Another embodiment of my invention that avoids both of these drawbacks is shown in FIGURE 5. There, the single delay network 19 in the E' branch of FIGURE 1 is replaced by two $\pi/4$ networks 24 and 26, one producing a delay in the E' branch and the other producing an advance in the E branch. The delay network 16 of FIGURE 1 is replaced by a phase shifter 35 that will alternately produce a shift of $+\pi/2$ and $-\pi/2$ at a predetermined rate smaller than the lowest expected Doppler frequency. Phase shifter 35 consists of two networks 17 and 18 inserted alternately by a switch 34 driven from a 10 Hz. generator 32. In addition the A-C output from amplifier 70 is fed to a phase-sensitive rectifier Re which consists of generator driven switch 74 and capacitors C1 and C2.

The phase shifter difficulty is avoided with the replacement and insertion of the two $\pi/4$ networks 24 and 26. Denoting the output of the two phase shifters 24 and 26, U' and U, and assuming that E' and E are in phase, it will be shown that U' and U have a phase difference of $\pi/2$ for all frequencies.

In FIGURE 6, the network is shown for E'.

$$i = \frac{E'}{R + \frac{1}{j\omega C}} = E' \frac{j\omega C}{1+j\omega RC}; \quad U' = \frac{1}{j\omega C} i = E' \frac{1}{1+j\omega RC}$$

In FIGURE 7, the network is shown for E.

$$i = E \frac{j\omega C}{1+j\omega RC}; \quad U = Ri = E \frac{j\omega RC}{1+j\omega RC}$$

Denoting the phase shifts for U' by $\varphi_1$ and for U by $\varphi_2$, we obtain:

$$\tan \varphi_1 = -\omega RC$$
$$\tan \varphi_2 = 1/\omega RC$$

This trigonometric relationship is shown in FIGURE 8 and it can be seen that $|\varphi_1+\varphi_2| = \pi/2$. If, therefore, E' and E are out of phase by $+\pi/2$, U' and U will be in or out of phase for all target speeds. To maintain the signal-to-noise ratio for the device, it would be desirable to keep the product $\overline{UU'}$ constant for all frequencies. It can be shown that, although the frequency dependence is not actually zero, it is acceptably small over a suitably wide range of frequencies.

$$\overline{U'} = \frac{1}{\sqrt{1+(\omega RC)^{2'}}}; \quad \overline{U} = \frac{\omega RC}{\sqrt{1+(\omega RC)^{2'}}}$$

$$\overline{UU'} = \frac{\omega RC}{1+(\omega RC)^2}$$

Now if RC is chosen equal to $1/\omega_0$ ($\omega_0$ being the most probable Doppler frequency) we can write:

$$\omega = \omega_0 + \Delta\omega; \quad \overline{UU'} = \frac{1+\frac{\Delta\omega}{\omega_0}}{1+\left(1+\frac{\Delta\omega}{\omega_0}\right)^2}$$

In FIGURE 9, $\overline{UU'}$ is plotted versus $\Delta\omega/\omega_0$ and it can be seen that the product does not show significant variations even for Doppler frequencies varying by a factor of 4. If the phase shifter is designed so that $\omega_0 = 1/RC$ and $\omega_0 = 100$ Hz. the product is 0.5 for 100 Hz., 0.4 for 50 Hz., and 0.4 for 200 Hz.

The problem of D-C amplification and the interfering offset voltage are alleviated in the circuit of FIGURE 5 by the substitution of the two phase shifters 17 and 18.

The voltage U is now, as the voltage E before, a continuous Doppler wave. In the embodiment of FIGURE 1, E'' was a Doppler wave, with phase changing from 0 to $\pi$ with respect to E for approaching and receding targets.

In the instant embodiment, U' is again a Doppler wave whose phase, however, alternates between 0 and $\pi$ at the switching rate of 10 Hz. as shown in FIGURE 10. Assuming eight Doppler cycles for a complete switching period, FIGURE 10a shows the condition for an approaching target. While the switch 34 is at the left, E'' is in phase with E. While the switch 34 is at the right, the voltages are in phase opposition. Hence, we obtain first attraction of the two coils 40 and 42 and then repulsion. In FIGURE 10b we see the conditions for a receding target. We obtain now first repulsion and then attraction.

The voltage delivered by the piezoelectric element 50 is proportional to the force. It is a wave at switching frequency whose phase reverses with respect to the output from generator 32. If the target reverses its direction, amplifier 70 is now a stable A-C amplifier with output detected in the phase-sensitive rectifier R*e*. There are now two means of integration: First, the piezoelectric element together with the movable coil is resonant at 10 Hz.; second, electric integration is derived from the RC network feeding meter 76.

If the A-C method according to FIGURE 5 is chosen, it is necessary either to design a balanced structure of the correlator so that mechanical vibrations of the support do not create excessive noise signals in the 10-Hz. frequency range, or to isolate the correlator acoustically from its surroundings.

In the Harry Diamond Laboratories, Washington, D.C., a FIGURE 1 device has been built. With the use of *x*-band waves and two simple horns as antennas, small targets moving in one direction could be easily detected in the presence of clutter signals exceeding the target return by many orders of magnitude, although an electronic correlator was employed instead of the electromechanical correlator shown in FIGURE 4, which ought to be much more effective.

It will be apparent that the embodiments shown are only exemplary and that various modifications can be made in construction and arrangement within the scope of the invention as defined in the appended claims.

I claim as my invention:

1. A moving target indicator which will distinguish between approaching and receding targets consisting of:
   (a) transmitting means adapted to transmit a signal at a certain frequency,
   (b) receiving means to receive the reflected portion of said transmitted signal from a target,
   (c) first mixing means for deriving a Doppler signal which is the difference in frequency between the transmitted and received signals,
   (d) second mixing means for deriving a Doppler signal which is the difference in frequency between the transmitted signal phase shifted by a predetermined amount and the received signal,
   (e) second phase shifting means for shifting the phase of the output signal from said second mixing means by a predetermined amount,
   (f) correlating means for comparing the signals produced by said first mixing means and said second phase shifting means and which will produce a signal of one polarity when said compared signals are out of phase and of the opposite polarity when said signals are in phase,
   (g) measuring means connected to the output of said correlator to determine whether the signals compared by said correlator means are in phase or out of phase.

2. The moving target indicator of claim 1 wherein the correlating means includes a first coil connected to the output of said first mixing means and fixed in position, a second coil connected to the output of said second phase shifting means and force measuring means to indicate whether the signals in said first and second coils cause the coils to attract or repel each other.

3. The moving target indicator of claim 2 wherein the force measuring means includes a bimorph piezoelectric element that is attached to the second coil and which will produce a signal of one polarity when the coils attract each other and a signal of the opposite polarity when the coils repel each other.

4. The moving target indicator of claim 3 wherein the first and second phase shifting means each delay the signal $\pi/2$, 5. The moving target indicator claim 4 wherein the measuring means includes an integrating circuit to integrate the signal produced by the piezoelectric element, D-C amplifying means connected to the output of said integrating circuit and meter means connected to measure the output of said D-C amplifier.

6. The moving target indicator of claim 5 wherein the integrating circuit is an RC circuit.

7. A moving target indicator which will distinguish between approaching and receding targets consisting of:
   (a) transmitting means adapted to transmit a signal at a certain frequency,
   (b) receiving means to receive the reflected portion of said transmitted signal from a target,
   (c) first mixing means for deriving a Doppler signal which is the difference in frequency between the transmitted and received signals,
   (d) first phase shifting means for alternately producing a leading and lagging phase shift at a predetermined frequency smaller than the lowest expected Doppler frequency,
   (e) second mixing means for deriving a Doppler signal which is the difference between the transmitter signal which has been phase shifted by said first phase shifting means and the received signal,
   (f) second phase shifting means to shift the output of said second mixing means a predetermined amount,
   (g) third phase shifting means to shift the output of said first mixing means a predetermined amount,
   (h) correlating means for comparing the signals produced by said second and third phase shifting means and which will produce a signal of one polarity when said compared signals are out of phase and of the opposite polarity when said signals are in phase,
   (i) measuring means connected to the output of said correlator to determine whether the signals compared by correlator means are in phase or out of phase.

8. The moving target indicator of claim 7 wherein the correlating means includes a first coil connected to the output of said third phase shifting means and fixed in position, a second coil connected to the output of said second phase shifting means and a force measuring means to indicate whether the signals in said first and second coils cause the coils to attract or repel each other.

9. The moving target indicator of claim 7 wherein the force measuring means includes a bimorph piezoelectric element that is attached to the second coil and which will produce a signal of one polarity when the coils attract each other and a signal of the opposite polarity when the coils repel each other.

10. The moving target indicator of claim 9 wherein the first phase shifting means will alternately shift the signal by a value of $\pi/2$.

11. The moving target indicator of claim 10 wherein the second phase shifting means will delay the signal by $\pi/4$.

12. The moving target indicator of claim 11 wherein the third phase shifting means will advance the signal by $\pi/4$.

13. The moving target indicator of claim 12 wherein the measuring means includes an A-C amplifier connected to amplify the signal produced by the piezoelectric element, an integrating circuit to integrate the output of the amplifier and a rectifier to change the integrated signal to a D-C signal, and meter means to measure the D-C signal and to indicate whether the target is approaching or receding from the moving target indicator.

References Cited

UNITED STATES PATENTS 3,229,284    1/1966    Rubin _____ 343—7.7 X

RODNEY D. BENNETT, *Primary Examiner.*

CHARLES L. WHITHAM, *Assistant Examiner.*